United States Patent
Miyaki et al.

(10) Patent No.: US 6,555,737 B2
(45) Date of Patent: Apr. 29, 2003

(54) PERFORMANCE INSTRUCTION APPARATUS AND METHOD

(75) Inventors: Tsuyoshi Miyaki, Hamamatsu (JP); Satoshi Sekine, Hamamatsu (JP); Takahiro Ohara, Hamamatsu (JP)

(73) Assignee: Yamaha Corporation (JP)

( * ) Notice: Subject to any disclaimer, the term of this patent is extended or adjusted under 35 U.S.C. 154(b) by 0 days.

(21) Appl. No.: 09/970,357

(22) Filed: Oct. 3, 2001

(65) Prior Publication Data
US 2002/0040633 A1 Apr. 11, 2002

(30) Foreign Application Priority Data
Oct. 6, 2000 (JP) ........................ 2000-307623

(51) Int. Cl.[7] .................. G09B 15/00; G09B 15/08
(52) U.S. Cl. .................. 84/477 R; 84/609; 84/610; 84/634; 84/478; 84/483.1; 84/485 R
(58) Field of Search .................. 84/600–602, 609–611, 84/634, 649–651, 666, 470 R, 477 R, 478, 483.1, 483.2, 485 R, DIG. 6

(56) References Cited

U.S. PATENT DOCUMENTS

| | | | |
|---|---|---|---|
| 5,585,583 A | 12/1996 | Owen | 84/470 R |
| 5,690,496 A | * 11/1997 | Kennedy | 84/610 |
| 5,739,457 A | 4/1998 | Devecka | 84/743 |
| 6,005,180 A | 12/1999 | Masuda | 84/622 |
| 6,066,791 A | * 5/2000 | Renard et al. | 84/470 R |
| 6,162,981 A | * 12/2000 | Newcomer et al. | 84/470 R |

FOREIGN PATENT DOCUMENTS

| | | |
|---|---|---|
| EP | 1 029 565 A2 | 8/2000 |
| GB | 2 328 553 A | 2/1999 |

* cited by examiner

Primary Examiner—Marlon T. Fletcher
(74) Attorney, Agent, or Firm—Rossi & Associates

(57) ABSTRACT

Pictures of a predetermined musical instrument, such as a drum set, and a model player are displayed, so as to visually indicate, in accordance with a progression of performance, which musical instrument should be operated or played and which of body parts, such as left and right hands and feet, should be used for playing the musical instrument. For example, different display colors may be allocated to the left and right hands so that each musical instrument to be played is displayed in such a color corresponding to the hand to be used for playing the musical instrument. A picture of a musical score may be displayed. Performance data and musical score data of a music piece and performance motion picture data may include time data that are based on their respective time scales. In reproduction, the respective time scales of the respective data are commonized to thereby permit synchronization between a reproductive music performance and visual display.

18 Claims, 5 Drawing Sheets

PERFORMANCE INSTRUCTION APPARATUS AND METHOD

BACKGROUND OF THE INVENTION

The present invention relates to performance instruction apparatus and methods for, in accordance with a progression of a music piece performance, automatically indicating or instructing performance operation to be executed by a human player, and more particularly to an improved performance instruction apparatus and method which allow a human player to practice playing a musical instrument by giving easy-to-identify performance instructions to the practicing human player.

Generally, it is extremely difficult for beginners to build or acquire skills for playing a musical instrument, step by step, by actually playing the musical instrument while merely viewing a textbook with a musical score and the like written thereon. Thus, in recent years, the widespread use of personal computers has produced music training systems which allow any interested person to build or acquire skills for playing an musical instrument by connecting a personal computer and a desired electronic musical instrument. One type of performance instruction apparatus employed in such training systems is designed to visually display, on a predetermined display device, a musical score (e.g., ordinary-type musical score using notes and musical symbols) of a particular music piece to be performed, so as to sequentially indicate or instruct a changing current performance position (i.e., position to be currently performed) on the displayed musical score in accordance with reproduction of the music piece to be performed. Another type of the performance instruction apparatus employed in the training systems is designed to display, on a predetermined display device, a picture of part of an electronic musical instrument of which a user wants to build or acquire playing skills, so as to sequentially indicate or instruct positions of performance operators to be operated on the displayed musical instrument in accordance with reproduction of the music piece to be performed. Each interested user can acquire the skills for playing the electronic musical instrument, by manipulating the musical instrument while being guided by the visual instructions on the display device. Namely, the conventionally-known performance instruction apparatus can provide a visual assistance, aid or guide for user's performance operation on the musical instrument by graphically displaying, via the predetermined display device, each current performance position on the displayed musical score, each performance operator to be currently operated, or the like.

However, the conventional performance instruction apparatus merely display a picture of part of a desired musical instrument to allow a user or human player to visually identify the position of each performance operator to be operated on the musical instrument. Therefore, in a situation where a novice player wants to learn how to play a musical instrument, such as a drum set, to be played using the entire body (including both hands and both feet) of the human player, and if only the position of each performance operator (in the case of the drum set, any one of a crash cymbal, hi-hat cymbals, bass drum, snare drum, tam—tam, etc.) to be operated on the musical instrument, the novice player often does not know how or with which style or mode the performance operator should be actually operated (e.g., which of the left and right hands should be used to operate the performance operator), so that the player may wrongly use the right hand to operate the performance operator that should be operated with the left hand. Namely, in such a case, the performance style with which the player actually plays the musical instrument tends to deviate from the correct performance style which the player should use. The deviation in the performance style would bring about significant inconveniences, such as a slight deviation between correct performance timing and actual timing of the player's performance operation.

SUMMARY OF THE INVENTION

In view of the foregoing, it is an object of the present invention to provide a performance instruction apparatus and method which allow a user or human player to readily know visually how each performance operator should be operated for a desired musical performance by, in accordance with reproduction of a music piece to be performed, not only visually indicating a particular body part to be used for operating the performance operator and but also graphically displaying model performance motion to be made for operating the performance operator.

In order to accomplish the above-mentioned object, the present invention provides a performance instruction apparatus which comprises: a supply section that supplies performance data; a processing section that executes a reproduction process for reproducing the supplied performance data; a display section; a control section that causes the display section to display a performance picture representative of model performance motion with which a music piece corresponding to the performance data reproduced by the processing section is being played by a model player using a predetermined musical instrument; and a display control section that, in accordance with a progression of reproduction of the performance data, changes a display style, on the performance picture displayed via the display section, of each musical instrument or portion thereof to be played currently into a particular display style corresponding to a body part of a player to be used for playing the musical instrument or portion thereof.

According to the present invention, a performance picture is displayed which indicates model performance motion with which a music piece corresponding to the performance data reproduced by the processing section is being played by a model player using a predetermined musical instrument. Also, in the present invention, each musical instrument or a portion of the musical instrument which is to be played currently is displayed, in accordance with a progression of the reproduction of the performance, in a particular display style corresponding to a player's body part that is to be used for playing the musical instrument or portion thereof. Thus, by just viewing the display, a user (practicing human player) is allowed to readily know visually which musical instrument or portion thereof should be operated or played and which body part of the player should be used for operating or playing the musical instrument or portion thereof. Thus, the present invention can be of great help to the user (practicing human player) in acquiring the skills for playing the musical instrument.

According to another aspect of the present invention, there is provided a performance instruction apparatus which comprises: a supply section that supplies performance data and musical score data of a music piece and performance motion picture data representative of model performance motion with which the music piece is being performed by a model player using a predetermined musical instrument; a display section; and a control section that executes a reproductive performance of the music piece on the basis of the performance data and causes the display section to display a musical score picture on the basis of the musical score data and a performance picture representative of model performance motion on the basis of the performance motion picture data while controlling the display, by the display section, of the musical score picture and the performance picture, in synchronism with a progression of the reproductive performance of the music piece. Thus, the present invention allows all of the reproductive performance, display of the musical score and display of the performance picture representative of the model performance motion to be carried out in synchronism with each other. The performance data, musical score data and performance motion picture data may include time data that are based on respective time scales, in which case the control section may convert the respective time data of the performance data, musical score data and performance motion picture data into time data based on a common time scale and cause the reproductive performance and display based on the performance data, musical score data and performance motion picture data to progress in synchronism with each other on the basis of the common time scale.

The present invention may be constructed and implemented not only as the apparatus invention as discussed above but also as a method invention. Also, the present invention may be arranged and implemented as a software program for execution by a processor such as a computer or DSP, as well as a storage medium storing such a program. Further, the processor used in the present invention may comprise a dedicated processor with dedicated logic built in hardware, not to mention a computer or other general-purpose type processor capable of running a desired software program.

While the embodiments to be described herein represent the preferred form of the present invention, it is to be understood that various modifications will occur to those skilled in the art without departing from the spirit of the invention. The scope of the present invention is therefore to be determined solely by the appended claims.

BRIEF DESCRIPTION OF THE DRAWINGS

For better understanding of the object and other features of the present invention, its embodiments will be described in greater detail hereinbelow with reference to the accompanying drawings, in which.

DETAILED DESCRIPTION OF EMBODIMENTS

Figure 1:
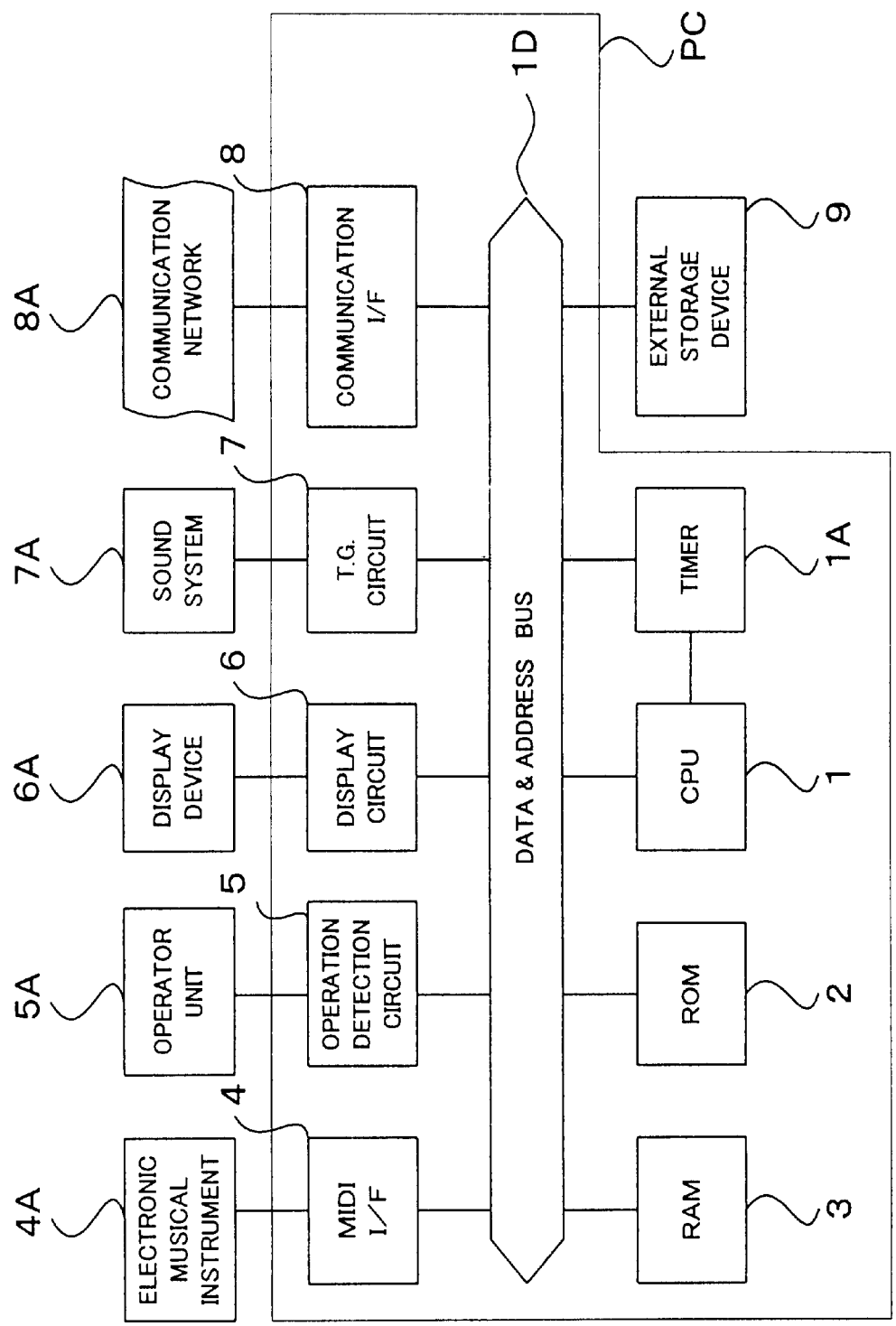
FIG. 1 is a block diagram showing an exemplary general hardware setup of a performance instruction apparatus in accordance with an embodiment of the present invention.

FIG. 1 is a block diagram showing an exemplary general hardware setup of a performance instruction apparatus in accordance with an embodiment of the present invention. The performance instruction apparatus comprises a computer, where performance instructions are given by the computer executing predetermined software programs for performing performance instructing processing based on the principles of the present invention. The performance instructing processing may of course be carried out by microprograms to be run by a DSP (Digital Signal Processor), rather than the computer software. In an alternative, the performance instruction apparatus of the invention may be implemented as a dedicated hardware apparatus including discrete circuits or integrated or large-size integrated circuit. Further, the performance instruction apparatus of the present invention may be implemented as an electronic musical instrument, karaoke apparatus, electronic game apparatus, multimedia equipment or any other type of product than the personal-computer-based product.

The performance instruction apparatus PC of the present invention shown in FIG. 1 is controlled by a microcomputer comprising a microprocessor unit (CPU) 1, a read-only memory (ROM) 2 and a random-access memory (RAM) 3. The CPU 1 controls all operations of the performance instruction apparatus. To the CPU 1 are connected, via a data and address bus 1D, the read-only memory 2, random-access memory 3, MIDI interface (I/F) 4, operation detection circuit 5, display circuit 6, tone generator (T.G.) circuit 7, communication interface (I/F) 8, and external storage device 9. Also connected to the CPU 1 is a timer 1A for counting various time periods, for example, to signal interrupt timing for timer interrupt processes. Namely, the timer 1A generates tempo clock pulses for counting a designated time interval or setting a performance tempo with which a music piece (training music piece) to be used by a user or human player to practice playing a musical instrument is automatically performed. The frequency of the tempo clock pulses generated by the timer 1A is adjustable via a tempo setting switch provided on an operator unit 5A that includes various switches, operators, etc. as will be later described. Such tempo clock pulses generated by the timer 1A are given to the CPU 1 as processing timing instructions or as interrupt instructions. The CPU 1 carries out various processes in accordance with such instructions. The various processes carried out by the CPU 1 in the instant embodiment include main processing that includes an automatic performance process for automatically performing a training music piece, various setting processes, etc., and interrupt processing including a process for displaying a performance instructing screen in performance training. Programs for these main processing and interrupt processing for execution by the CPU 1 are supplied via the communication interface 8 from a communication network 8A and then stored into the external storage device 9, such as a hard disk, so that any desired one of the programs can be loaded from the external storage device 9 into the RAM 3. In an alternative, the programs for these main processing and interrupt processing for execution by the CPU 1 may be prestored in the ROM 2.

The ROM 2 has prestored therein various programs to be executed by the CPU 1 and various data to be referred to by the CPU 1. The RAM 3 is used as a working memory for temporarily storing automatic performance information to be used in automatically performing a selected training music piece (such as performance data for automatically performing the training music piece), model performance motion data indicative of model performance motion with which a predetermined model player is performing a training music piece, and data produced as the CPU 1 executes a predetermined program. Further, the RAM 3 is used as a memory for storing a currently-executed program and data related thereto. Predetermined address regions of the RAM 3 are allocated and used as registers, flags, tables, etc.

The MIDI interface (I/F) 4 is an interface through which MIDI tone information (MIDI data) is input from an electronic musical instrument 4A or the like or output from the performance instruction apparatus PC to the electronic musical instrument 4A or the like. Note that the electronic musical instrument 4A may be of any desired type, such as a keyboard type, guitar type, wind instrument type, percussion instrument type or gesture type, as long as it can generate MIDI data in response to performance operation by a user or human player. In the instant embodiment, the user or human player can practice a musical performance using the electronic musical instrument 4A by connecting the electronic musical instrument 4A to the performance instruction apparatus PC via the MIDI interface 4.

Note that the MIDI interface 4 may be a general-purpose interface rather than a dedicated MIDI interface, such as RS232-C, USB (Universal Serial Bus) or IEEE1394, in which case other data than MIDI event data may be communicated through the MIDI interface 4 at the same time. In the case where such a general-purpose interface as noted above is used as the MIDI interface 4, the electronic musical instrument 4A may be designed to communicate other data than MIDI event data. Of course, the tone information handled in the present invention may be of any other data format than the MIDI format, in which case the MIDI interface 4 and electronic musical instrument 4A are constructed in conformity to the data format of the tone information.

The operator unit 5A includes various switches and operators for designating various pieces of information to be displayed on a display device 6A for purposes of musical performance training, inputting various musical conditions to be used for automatically performing a selected training music piece. For example, the operator unit 5A may includes training-music-piece selecting switches for selecting a desired one of a plurality of training music pieces to be used for musical performance training, a training start switch for instructing a start of musical performance training, etc. The operator unit 5A may also include various other operators, such as a numerical-value-data inputting ten-key pad, text-data inputting keyboard and mouse. The operation detection circuit 5 constantly detects respective operational states of the individual operators on the operator unit 5A and outputs switch information, corresponding to the detected operational states of the operators, to the CPU 1 via the data and address bus 1D. The display circuit 6 visually displays, on the display device 6A that may comprise an LCD (Liquid Crystal Display) or CRT (Cathode Ray Tube), various pieces of information, such as a musical score picture representing a musical score of the selected training music piece and a performance motion picture showing, via computer graphics (CG), model performance motion indicative of an exemplary manner or state in which a model player is performing the selected training music piece using a given musical instrument. Also, the display circuit 6 displays, on the display device 6A, various information representing, for example, settings of tone pitches, colors, effects, etc. related to an automatic performance and controlling state of the CPU 1, etc.

The tone generator (T.G.) circuit 7, which is capable of simultaneously generating tone signals in a plurality of channels, receives information, such as performance data related to the training music piece, supplied via the data and address bus 1D and generates tone signals based on the received information. Each of the tone signals thus generated by the tone generator circuit 7 is audibly reproduced or sounded by a sound system 7A. The tone generator circuit 7 and sound system 7A may be constructed in any conventional manner.

The communication interface 8 is connected to the wired or wireless communication network 8A, such as a LAN (Local Area Network), the Internet or telephone line network, via which it may be further connected to a desired sever computer (not shown) so as to input a desired control program and various data to the main body of the performance instruction apparatus PC. Thus, in a situation where a particular control program and various data are not contained in the ROM 2 or external storage device (hard disk) 9, these control program and data can be downloaded from the server computer via the communication interface 8 to the performance instruction apparatus PC. In such a case, the performance instruction apparatus PC, which is a "client", sends a command requesting the server computer to download the control program and various data by way of the communication interface 8 and communication network 8A. In response to the command from the client, the server computer delivers the requested control program and data to the performance instruction apparatus PC via the communication network 8A. The performance instruction apparatus PC receives the control program and data via the communication interface 8 and accumulatively store them into the external storage device (hard disk) 9. In this way, the necessary downloading of the control program and various data is completed.

The external storage device 9 is provided for storing sets of performance data related to training music pieces, sets of musical score data for displaying, on the display device 6A, a musical score corresponding to the contents of a selected one of the performance data sets, sets of performance motion data displaying, on the display device 6A, model performance motion corresponding to the contents of a selected one of the performance data sets, and data relating to control of the various programs to be executed by the CPU 1. In a case where a particular control program is not prestored in the ROM 2, the control program may be prestored in the external storage device (e.g., hard disk device) 9, so that, by reading the control program from the external storage device 9 into the RAM 3, the CPU 1 is allowed to operate in exactly the same way as in the case where the particular control program is stored in the program memory 2. This arrangement greatly facilitates version upgrade of the control program, addition of a new control program, etc. The external storage device 9 may use any of various removable-type media other than the hard disk (HD), such as a floppy disk (FD), compact disk (CD-ROM or CD-RAM), magneto-optical disk (MO), digital versatile disk (DVD) and semiconductor memory card.

In the performance instruction apparatus PC shown in FIG. 1, the performance data are read out from the external storage device 9 or the like in accordance with a user selection, and the contents of the read-out performance data are displayed on the display device 6A. Also, the musical score data set and performance motion data set associated with the read-out performance data set are read out from the external storage device 9 or the like and musical score and performance motion pictures are displayed in accordance with the contents of the read-out musical score data and performance motion data, as will be later described. Namely, the performance instruction apparatus PC allows the user to practice a musical performance while viewing the musical score picture and performance motion picture, by thus prestoring a multiplicity of sets of performance data and musical score data and performance motion data corresponding to the performance data sets and reading out the user-selected performance data set and sets of the musical score data and performance motion data corresponding to the performance data set to thereby display the musical score picture and performance motion picture on the display device 6A.

Figure 2:
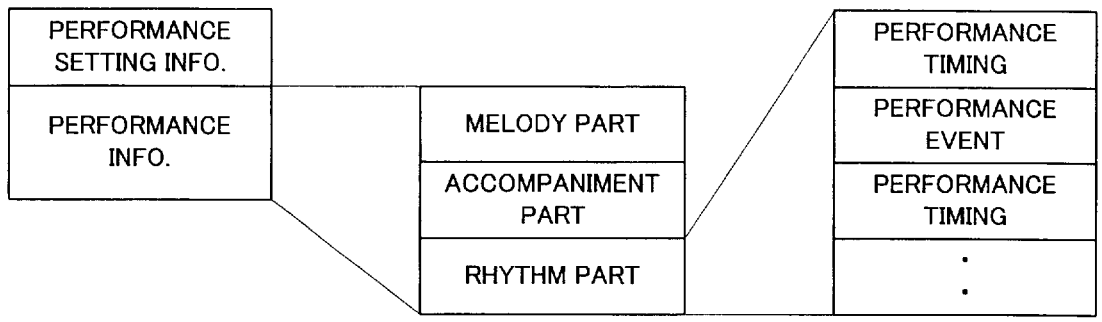
FIG. 2 is a conceptual diagram showing an exemplary data organization of performance data employed in the performance instruction apparatus of FIG. 1.
Figure 3:
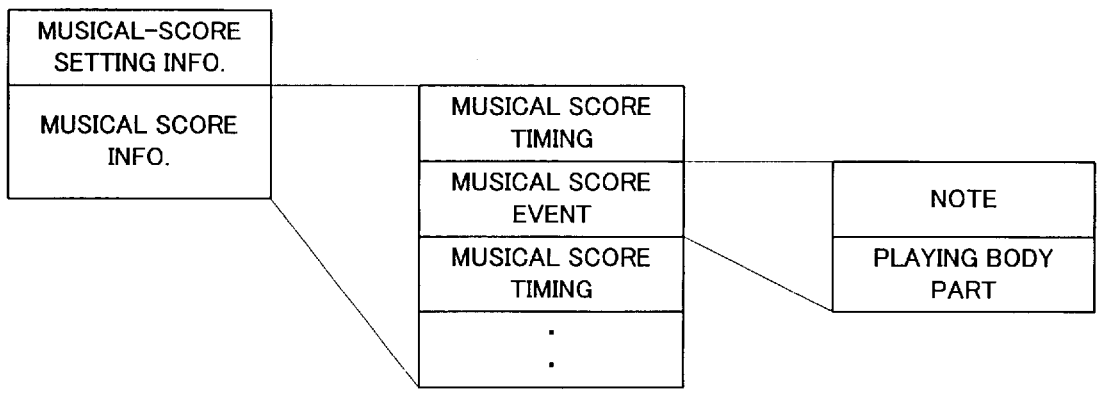
FIG. 3 is a conceptual diagram showing an exemplary organization of musical score data employed in the performance instruction apparatus.
Figure 4:
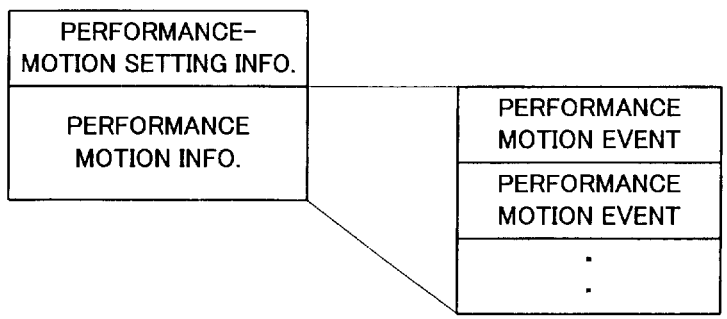
FIG. 4 is a conceptual diagram showing an exemplary organization of performance motion data employed in the performance instruction apparatus.

The following paragraphs describe respective data organizations of the performance data, musical score data and performance motion data, with reference to FIGS. 2 to 4. FIG. 2 is a conceptual diagram showing an exemplary data organization of the performance data.

As shown, each set of the performance data comprises data to be used for reproducing a model performance of a selected training music piece, and the performance data set includes data of a plurality of performance parts recorded in a predetermined file format, such as the conventionally-known SMF (Standard MIDI file) format. As seen from FIG. 2, the performance data set comprises two major groups: performance setting information and performance information. The performance setting information is for setting various reproduction styles to be used during an automatic performance, which includes, for example, tempo data for setting a tempo with which to reproduce the performance data, tone color data for setting a tone color or timbre and tone volume data for setting a tone volume. The performance information, on the other hand, is representative of contents of the music piece to be reproductively performed in an automatic fashion, which comprises combinations of performance timing data and performance event data for individual performance parts, such as a melody part, accompaniment part and rhythm part, in order of a predetermined performance progression.

Assume that in the instant embodiment, the melody part is for storing a melody of the music piece, the accompaniment part for storing accompaniments other than a rhythm accompaniment, such as bass and chord performances, of the music piece, and the rhythm part for storing the rhythm accompaniment.

The performance timing data for each of the performance parts are data indicative of time points (namely, timing) for processing individual performance event data, such as tone generating and tone deadening event data, to reproduce the music piece, and the performance timing data can be represented by the number of clock pulses corresponding to or based on MIDI clock pulses. The performance timing data are each data representing occurrence timing of a performance event in an absolute time (i.e., an absolute number of clock pulses) measured or counted from the beginning of the music piece or given measure. The performance data may be in any format, such as: the "event plus absolute time" format where the time of occurrence of each performance event is represented by an absolute time within the music piece or a measure; the "event plus relative time" format where the time of occurrence of each performance event is represented by a time length from the immediately preceding event; the "pitch (rest) plus note length" format where each performance data is represented by a pitch and length of a note or a rest and a length of the rest; or the "solid" format where a memory region is reserved for each minimum resolution of the performance and each performance event is stored in one of the memory regions that corresponds to the time of occurrence of the performance event.

Furthermore, where performance data for a plurality of channels are handled, the performance data for the plurality of channels may be stored together in a mixture. Furthermore, the performance music piece data may be processed by any suitable scheme, such as one where the processing period of the performance data is varied in accordance with the currently-set tempo, one where the value of each timing data being automatically performed is varied in accordance with the currently-set tempo with the processing period kept constant, or one where the way of counting the timing data in the performance data is varied per processing in accordance with the currently-set tempo with the processing period kept constant. Moreover, time-serial performance data may be stored in successive storage regions of a memory, or performance data stored dispersedly in non-successive storage regions may be managed as successive data. Namely, it is only necessary that the performance data be capable of being managed as time-serial data, and it does not manner whether or not the performance data are actually stored in succession in a memory.

The performance event data for each of the performance parts are indicative of contents of individual performance events, such as tone generating and tone deadening event data, to reproduce the music piece. Examples of the performance events include key-on, key-off, tempo change, tone color change events, and an automatic performance is carried out on the basis of these performance events.

FIG. 3 is a conceptual diagram showing an exemplary organization of the musical score data employed in the performance instruction apparatus PC of the invention. Each set of the musical score data comprises data for visually displaying, on the display device 6A, a musical score corresponding in contents to a selected set of the performance data. A plurality of sets of the musical score data are stored in association with the sets of the performance data. In the illustrated example, information corresponding to the rhythm part is stored as the musical score data. Namely, the following paragraphs describe an example where the user selects a rhythm part like a drum part and practices playing a musical instrument, such as a drum set, to be employed for performance of the selected rhythm part.

Figures 5, 6, 7:
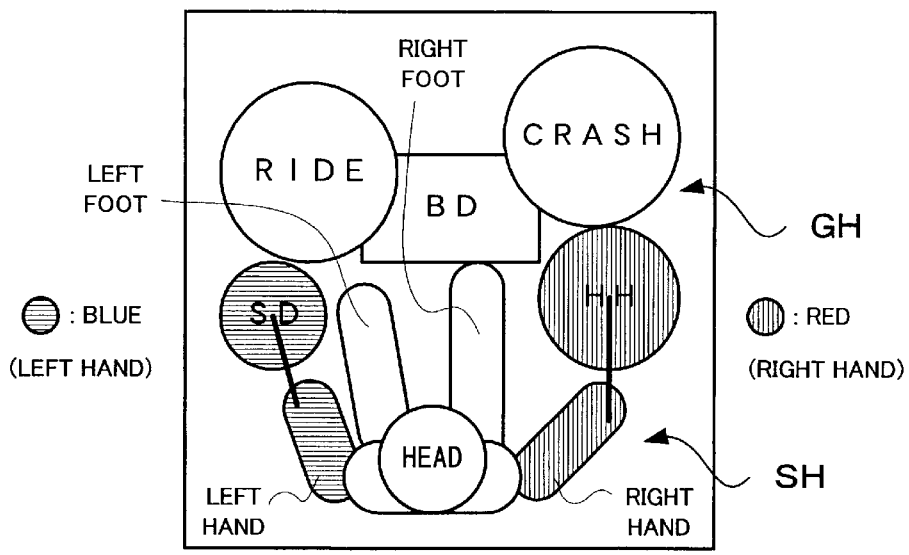
FIG. 5 is a conceptual diagram showing an example of the performance motion screen to be displayed on the display device.
FIG. 6 is a diagram showing an example of a musical score screen to be displayed on a display device in the performance instruction apparatus.
FIG. 7 is a conceptual diagram showing another example of a playing body part picture on the musical score screen.

As seen from FIG. 3, each of the musical data sets comprises musical-score setting information and musical score information. The musical-score setting information includes basic information, such as information indicative of a musical time and musical key, for visually displaying a musical score as shown in FIG. 6. The musical score information is representative of individual notes of the music piece to be automatically performed, and the musical score information comprises combinations of musical score timing data and musical score event data in order of a performance progression (i.e., in displayed order of the music score on the display device 6A). The musical score timing data are each data indicative of a displayed position of a musical score event on the display device 6A. The musical score timing data are each represented by the number of clock pulses corresponding to or based on MIDI clock pulses, similarly to the above-mentioned performance timing data. The musical score event data are each representative of contents of a musical score event, and include note data and playing body part data indicative of a particular body part of the human player to be used for performance of the note.

The note data included in the musical score event data are descriptive of respective types of the notes (such as half note, quarter note and triplet of eighth notes) constituting the music piece, type of the musical instrument (in the case of the drum set, respective types of individual instruments constituting the drum set, such as hi-hat cymbals, bass drum, snare drum and tam—tam), styles of rendition (in the case of the drum set, snare roll, open hi-hat, closed hi-hat, rim shot, cymbal choke, etc.). Individual notes, instrument types and styles of rendition of the music piece are shown on the display device 6A with reference to such contents of the note data.

The playing body part data are each indicative of a particular body part of the human player to be used for playing a particular musical instrument (hereinafter called a "playing body part") and each imparted to one note event. Where the drum set is to be played, the human player can use his or her right hand, left hand, right foot, left foot, head, etc., so that data indicative of the right hand, left hand, right foot, left foot, head, etc. are stored as the playing body part data in association with individual note events. By thus storing the to-be-performed notes in association with the playing body parts, the performance instruction apparatus PC can indicate, to the user or human player, performance operation on a note-by-note basis.

FIG. 4 is a conceptual diagram showing an exemplary organization of the performance motion data employed in the performance instruction apparatus PC of the invention. The performance motion data are designed for visually displaying, on the display device 6A, model performance motion of a predetermined model player performing a training performance part of the music piece based on the selected performance data set, as illustrated in FIG. 5. In the instant embodiment, the performance motion of the model player is displayed in accordance with a progression of the music piece (i.e., reproduction of the performance data) using computer graphics (CG) or the like. As an example, a plurality of sets of the performance motion data are prestored in association with the sets of the performance data, in a similar manner to the sets of the musical score data.

As seen from FIG. 4, each set of the performance motion data comprises performance-motion setting information and performance motion information. The performance-motion setting information includes various setting information for displaying a performance motion picture on the display device 6A. Specifically, the performance-motion setting information includes information of an initial picture representative of initial displayed states of the performance motion picture (e.g., initial displayed states of a musical instrument image indicative of a musical instrument used for performance of the training performance part and player image indicative of motion of a model player playing the musical instrument), and information representative of a portion of the player image indicating a particular playing body part. The performance motion information is designed for displaying player's motion as the player image, and multiple pieces of information representing performance motion states, i.e. pieces of frame-by-frame picture information (hereinafter "performance motion event data") to be displayed as the player image at predetermined time intervals of, for example, 1/60 sec. are stored as the performance motion information in order of a time progression (i.e., order of a performance progression). Namely, sequentially reading out the performance motion event data at predetermined time intervals can display, as the performance motion picture, an animated picture of the model player playing the musical instrument.

The performance motion event data may each be data representative of a frame of a performance motion picture to be displayed; the performance motion event data may be other than data representative of an entire frame of a performance motion picture, such as data indicative of variation values of the frame. For example, there may be prestored, as frame data, data indicative of variations in playing body part from the initial picture (i.e., variation values of the play body parts). More specifically, variation value data may be prestored which, for example, indicate to what extent the right elbow of the model player has bent, to what extent the left leg of the model player has bent and to what extent the neck of the model player has moved in front-and-rear and left-and-right directions as compared to those in the initial displayed states of the player image. Similar performance motion information may be stored in relation to the musical instrument image as well.

Namely, the performance instruction apparatus PC in accordance with the present invention is constructed to provide performance instructions to the user or practicing human player, by displaying, on the display device 6A, not only a musical score screen indicating a musical score of a selected training music piece and playing body parts to be used for playing a musical instrument allocated to the training music piece but also a performance motion screen indicating an image of the musical instrument allocated to the selected training music piece ("musical instrument image") and an image of a model player playing the instrument (player image) on the basis of the performance data, musical score data and performance motion data. The following paragraphs describe detailed contents to be displayed on the performance motion screen and musical score screen, with reference to FIGS. 5 and 6.

FIG. 5 is a conceptual diagram showing an example of the performance motion screen to be displayed on the display device 6A. The performance motion screen displays a succession of performance motion pictures on the basis of the performance motion data; namely, the performance motion screen displays musical instrument images GH and player images SH on the basis of the performance motion event data read out from among the performance motion data at predetermined time intervals. Each of the musical instrument images GH presents a musical instrument of a predetermined or selectable training performance part which is placed in a given position. FIG. 5 illustrates an example of the musical instrument image GH to be displayed in connection with a case where the training performance part is a rhythm part and a drum set is used as a rhythm musical instrument. In the musical instrument image GH of FIG. 5, "CRASH" represents a crash cymbal, "RIDE" a ride cymbal, "BD" a bass drum, "HH" hi-hat cymbals, and "SD" a snare drum.

Each of the player images SH, on the other hand, presents performance motion of the model player playing the musical instrument presented in the musical instrument image GH. Namely, the model player is presented in a succession of the player images SH as if the player were actually playing the musical instrument in accordance with a progression of a selected training music piece. At that time, display styles of every musical instrument to be played next and playing body parts to be used for playing the musical instrument are varied from normal display styles, in accordance with a progression of the model performance of the training music piece. In this case, the display styles or modes of the playing body parts to be used for playing the to-be-next-played musical instrument are changed to respective more-distinguishable display styles (e.g., display colors) preset for the individual playing body parts. FIG. 5 shows examples of the more-distinguishable display styles in connection with a case where the practicing human player has been given instructions to play the hi-hat cymbals HH with the right hand and play the snare drum SD with the left hand. Namely, in such a case where the hi-hat cymbals HH and snare drum SD are musical instruments to be next played and the right and left hands are playing body parts to be used respectively for the to-be-next-played musical instruments, the right hand and hi-hat cymbals HH are displayed in one display style (e.g., red color) preset for the right hand; note that in FIG. 5, the display style (e.g., red color) used for the right hand and hi-hat cymbals HH is denoted by a mesh of vertical lines in place of the red color. Further, the left hand and snare drum SD are displayed in another display style (e.g., blue color) preset for the left hand; note that in FIG. 5, the display style (e.g., blue color) used for the left hand and snare drum SD is denoted by a mesh of horizontal lines in place of the blue color. The other musical instruments than the ones used on this occasion (i.e., crash cymbal CRASH and bus drum BD in the illustrated example) and the other playing body parts than the ones used on this occasion (i.e., head and left and right feet in the illustrated example) are left unchanged from the normal display style. With such an arrangement that every musical instrument necessary for a performance and every playing body part to be used for playing the musical instrument are visually displayed together, the performance instruction apparatus PC can provide visual easy-to-identify performance instructions to the user or practicing human player.

Whereas the musical instrument image GH and player images SH of the performance motion picture are shown in FIG. 5 as presenting the musical instrument and player from above the head of the player, these musical instrument image GH and player images SH may be ones presenting the musical instrument and player in question in any desired direction and at any desired angle. Further, the performance motion picture may be a three-dimensional picture rather than a flat two-dimensional picture. Furthermore, whereas the musical instrument image GH and player images SH of the performance motion picture are shown in FIG. 5 in a simplified or simulated fashion for convenience of illustration, the present invention is not limited to such simplified images. The musical instrument and player images to be presented as the images GH and SH may be images of an actual musical instrument and real human player (such as a famous drummer), or modified (deformed) musical instrument and cartoon character and the like popular with children. The predetermined more-distinguishable display styles corresponding to individual playing body parts may be other than by display colors, such as by blinking illumination or letters.

FIG. 6 is a diagram showing an example of the musical score screen to be displayed on the display device 6A. The musical score screen is displayed on the display device 6A together with the performance motion screen, which presents a musical score picture and playing body part picture as will be described below. The musical score picture presents a musical score based on the musical score data. Namely, the musical score is displayed on the display device 6A in accordance with the musical score event data read out from among the musical score data on the basis of the MIDI clock pulses. For example, a plurality of musical score segments constituting the musical score are displayed sequentially, two measures at a time, in accordance with a progression of the model performance. More specifically, musical score segments of only two measures are displayed at one time, and once the performance of the displayed two measures has been completed, they are erased to be replaced by musical score segments of next two measures. In this way, the musical score of the training music piece is displayed, as the musical score picture, for each predetermined length from the beginning to end of the training music piece in accordance with a progression of the model performance.

In the playing body part picture, each playing body part to be used for playing the musical instrument of the training performance part is presented by associating the playing body part data of the musical score event data with the note event data. Namely, the playing body parts are displayed in such a manner that the body parts correspond to the notes on the displayed musical score. The playing body parts are displayed only for the musical instrument of the training performance part. FIG. 6 shows a case where performance instructions are provided for predetermined percussion instruments to be played with hands (e.g., in the case of the drum set, a crash cymbal, hi-hat cymbals, snare drum, etc.). For each musical instrument to be played with a foot (e.g., in the case of the drum set, a bass drum), the playing body part display may be dispensed with, because no specific performance instruction is often required. Thus, only necessary playing body parts can be displayed clearly, so that the user can easily identify instructions of the playing body parts. Of course, even for a performance using a foot or foot, each playing body part, such as a foot, necessary for the performance may be displayed, as necessary.

Upon start of performance of the training music piece, a performance-position instructing picture is displayed in a predetermined style in accordance with a progression of the training music piece performance; in the illustrated example, a changing current performance position is indicated by a vertical rectangular performance-position instructing bar P. Namely, the performance-position instructing bar P is continuously moved horizontally rightward on the musical score picture and playing body part picture, to thereby indicate, to the user, notes to be performed and playing body parts to be used for performing the notes.

Note that the musical score picture may be displayed in any other suitable style than the above-described. For example, the playing body part picture may be displayed in a display style as shown in FIG. 7. Namely, FIG. 7 is a conceptual diagram showing another example of the playing body part picture on the musical score screen.

Where playing body parts are to be displayed on the musical score screen, there may be employed a display style in which a playing body part is displayed for each musical instrument, as shown in FIG. 7. For example, where performance instructions are to be provided for percussion instruments to be played with a hand (e.g., in the case of the drum set, a crash cymbal, hi-hat cymbals, snare drum, etc.), a playing body part is displayed for each of the musical instruments. In the illustrated example of FIG. 7, performance of the crash cymbal with the right hand, performance of the hi-hat cymbals with the right hand and performance of the snare drum with the left hand are instructed in accordance with a progression of performance of the training music piece. By thus displaying a playing body part for each musical instrument, the user is allowed to readily know how a given performance position located a little ahead of a current performance position should be performed (i.e., performance operation to be executed for the given performance position). The display of the playing body part for each musical instrument is carried out with reference to the instrument type data included in the note data of the musical score data and the playing body part corresponding to the note data.

Figure 8:
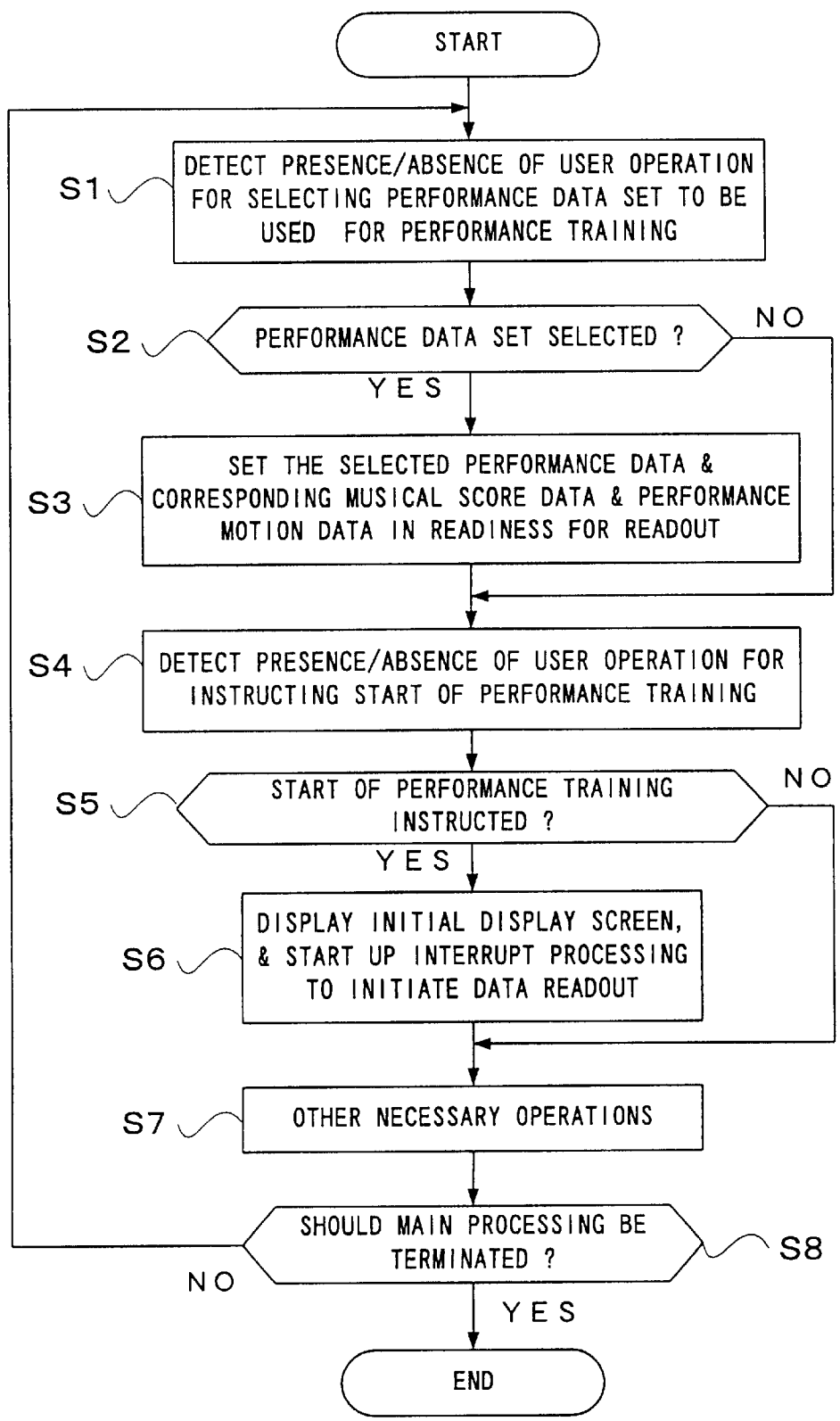
FIG. 8 is a flow chart showing an exemplary operational sequence of main processing carried out by a CPU in the performance instruction apparatus.
Figure 9:
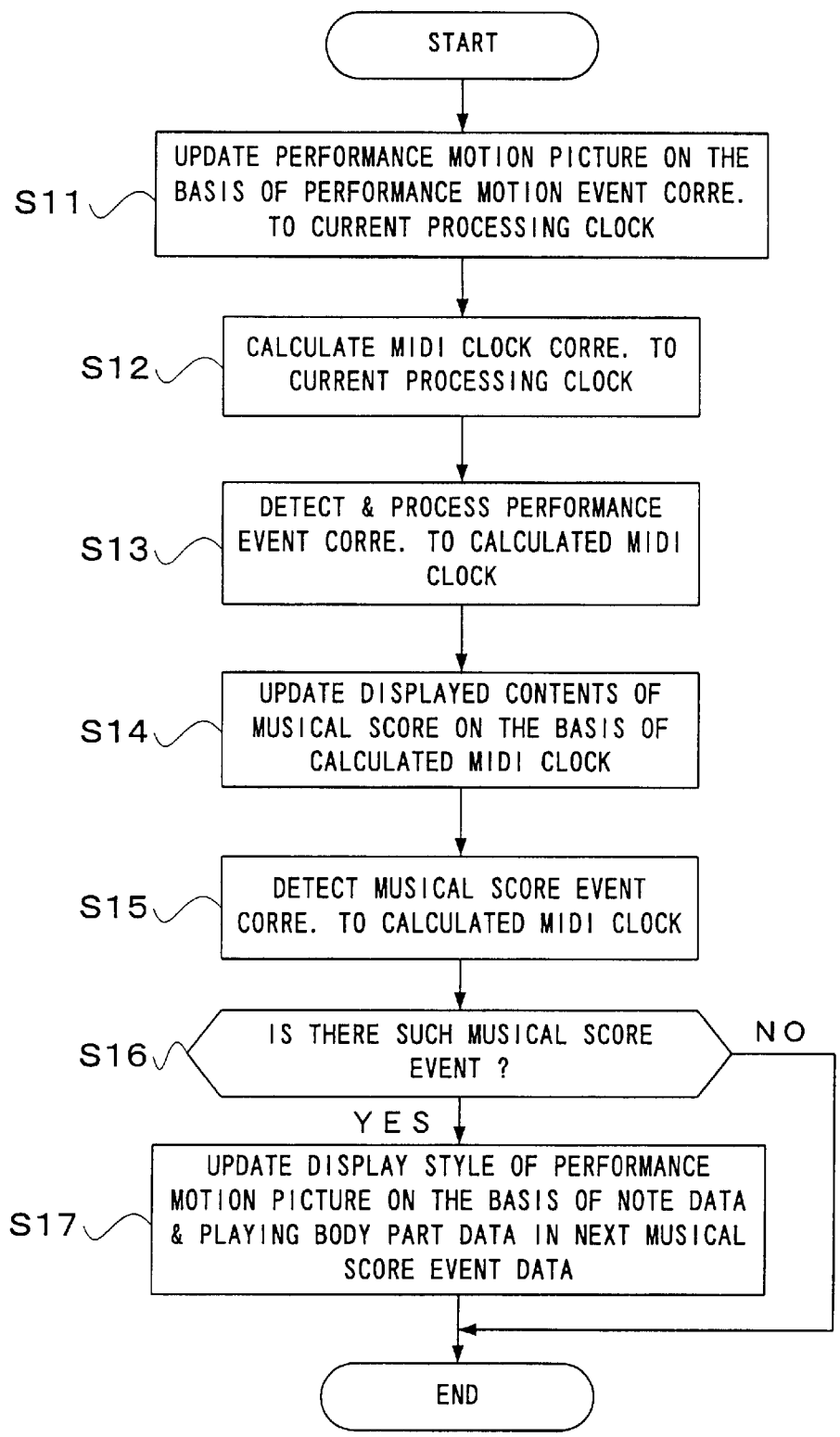
FIG. 9 is a flow chart showing an exemplary operational sequence of interrupt processing carried out by the CPU in the performance instruction apparatus.

As described above, the performance instruction apparatus PC shown in FIG. 1 is arranged to not only read out the performance data from the ROM 2, RAM 3, external storage device 9 or the like, in accordance with a user selection, to thereby execute a model performance on the basis of the read-out performance data, but also read out the musical score data and performance motion data, corresponding to the performance data, to thereby visually display performance instructions on the display device 6A in accordance with the thus read-out musical score data and performance motion data. Namely, in the performance instruction apparatus PC of the present invention, a multiplicity of sets of the performance data, musical score data and performance motion data are stored in the ROM 2, RAM 3 or external storage device 9 and selected ones of the sets of the performance data, musical score data and performance motion data are read out and displayed on the display device 6A, so as to provide visual performance instructions to the user or practicing human player. Note that tones by the model performance need not necessarily be generated in audible form and may be processed to be muted or silenced as appropriate. Such performance instructions are issued by the CPU 1 of the performance instruction apparatus PC executing predetermined software programs to implement the performance instruction processing. Therefore, a description will be made below about the performance instruction processing carried out by the CPU 1, with reference to FIGS. 8 and 9. FIG. 8 is a flow chart showing an exemplary operational sequence of the main processing carried out by the CPU 1 of the above-described performance instruction apparatus PC, while FIG. 9 is a flow chart showing an exemplary operational sequence of the interrupt processing carried out by the CPU 1.

At first step S1 of the main processing shown in FIG. 8, detection is made on presence/absence of user operation for selecting one of the performance data sets to be used for performance training. At step S2, a determination is made as to whether or not there has been executed such operation for selecting any one of the sets of the performance data. Namely, at these steps, it is detected whether the user has executed manual operation, using the operator unit 5A (e.g., training-music-piece selecting switch), to directly enter the name of a desired music piece or select one of music piece names displayed on the display device 6A with a view to selecting a music piece to be performed as a model performance for performance training. If the user has selected a desired one of the performance data sets (YES determination at step S2), the selected performance data set and the musical score data and performance motion data sets corresponding to the selected performance data set are set, at step S3, in readiness for initiation of readout from memory. If no performance data set has been selected (NO determination at step S2), the CPU 1 proceeds to step S4 without executing the operation of step S3; namely, in this case, the selected performance data set and the corresponding musical score data and performance motion data sets are not set in readiness for initiation of readout from memory. At next step S4, detection is made about presence/absence of user operation for instructing a start of performance training on the operator unit 5A (e.g., training-music-piece selecting switch). At step S5, it is determined, on the basis of the detection at step S4, whether the user has instructed a start of performance training. If such a start of performance training has been instructed by the user as determined at step S5, the CPU 1 goes to next step S6, where an initial screen indicative of initial display states of a performance motion screen and musical score screen are displayed on the display device 6A, and then the later-described interrupt processing is started up to initiate the readout of the selected performance data and corresponding musical score data and performance motion data. Namely, by the operation of step S6, the performance data and corresponding musical score data and performance motion data are read out, and performance instructions are provided by sequentially updating the displayed contents of the performance motion screen and musical score screen in accordance with the contents of the read-out data. If, on the other hand, the start of performance training has not been instructed as determined at step S5 (NO determination at step S5), the CPU 1 jumps over step S6 to step S7; namely, in this case, the interrupt processing is not started up so that no performance instructions are provided. At step S7, some other necessary operations are carried out. In the instant embodiment, the other operations include, for example, a normal performance process for generating and deadening tones in response to performance operation executed by the user with the electronic musical instrument 4A or the like, a normal tone setting process for setting a performance tempo of the training music piece, tone volumes of individual performance parts, and a process for setting display styles of playing body parts on the performance operation screen and musical score screen. In the display-style setting process, the user is allowed to change the display style for any of the playing body parts; for example, the display color may be changed for each of the playing body parts in accordance with preference of the user. As an example, the user can change a red color display preset for the right hand to a yellow color display and a blue color display preset for the left hand to a green color display. Results of such display style changes (i.e., changed display style settings) are recorded into a predetermined recording area so that they are used in a display-style updating process during performance training. At following step S8, a further determination is made as to whether or not the main processing should be terminated. If answered in the affirmative at step S8, the main processing is brought to an end. If, on the other hand, the main processing should not be terminated (NO determination at step S8), the CPU 1 reverts to step S1 in order to repeat the above-described operations of step S1 to S8.

The following paragraphs describe details of the interrupt processing carried out at step S6 above. This interrupt processing is executed in response to every processing clock pulse generated in the performance instruction apparatus PC; that is, the interrupt processing is triggered interrupting the main processing per clock pulse generated by the timer 1A. Note that timing of the processing clock pulses does not coincide with MIDI clock timing stored in the timing data of the performance data or musical score data; to facilitate understanding, let it be assumed here that the cyclic period of the processing clock pulses is 1/60 sec. that is the time interval between the successive performance motion event data. Once the interrupt processing is started up, reproduction of the music piece based on the selected performance data set, display of the musical score picture based on the musical score data and display of the performance motion picture based on the performance motion data are carried out during a time period from the start to end of the performance training while the software program of the performance instruction processing is running on the performance instruction apparatus PC.

At next step S11 of the interrupt processing, the performance motion picture is updated on the basis of the performance motion event data corresponding to the current processing clock pulse. Namely, the performance motion event data corresponding to the timing of the current processing clock pulse, having triggered current execution of the interrupt processing, is read out from among the performance motion data having been set earlier in readiness for readout at step S3 of FIG. 8, and the contents of the performance motion picture currently displayed on the display device 6A are updated on the basis of the read-out performance motion event data. In this way, a picture of a predetermined model player playing the musical instrument of the training part in accordance with a progression of the training music piece performance is displayed as the performance motion picture on the display device 6A. As next step S12, the CPU 1 calculates a MIDI clock pulse corresponding to the processing clock pulse having triggered the current execution of the interrupt processing. Namely, because each of the performance timing data and musical score timing data described in the performance data and musical score data is represented by the number of clock pulses that are not identical to, but based on, the MIDI clock pulses, the data can not be finally set (finalized) without being converted into the MIDI clock representation. More specifically, because time data based on the processing clock pulses of the performance motion data substantially differ in time scale from time data based on the MIDI clock pulses, the data based on the MIDI clock pulses can not be accurately read out if the processing clock pulses are used as they are. Thus, in the instant embodiment, the MIDI clock pulse corresponding to the processing clock pulse having triggered the current execution of the interrupt processing is calculated so as to finalize the performance timing data and musical score timing data and thereby detect the performance event data (see step S13 to be described later) and musical score event data (see step S15 to be described later). Namely, the time scales of the individual data are adjusted to be the same or commonized.

At step S13, the performance event data corresponding to the MIDI clock pulse having been calculated at step S12 above is detected from among the performance data and then processed in a predetermined manner. Namely, the performance event data for the individual performance parts recorded at the position corresponding to the MIDI clock pulse calculated on the basis of the current processing clock pulse, having triggered the current execution of the interrupt processing, are read out from among the performance data having been set earlier in readiness for readout at step S3 of FIG. 8, and an automatic performance is carried out on the basis of the thus read-out performance event data. If an arrangement is made such that, during the automatic performance, the performance event data of the training performance part is not audibly reproduced at all or sounded with a lower tone volume than the performance event data of the other performance parts, then the user can here clearly each tone performed by his or her own performance operation; this arrangement is preferable in that it achieves a benefit of allowing the user to readily identify any error in his or her own performance operation.

At next step S14, the displayed contents of the musical score on the display device 6A are updated on the basis of the MIDI clock pulse calculated at step S12 above. Namely, if the MIDI clock pulse, calculated on the basis of the processing clock pulse having triggered the current execution of the interrupt processing, represents a predetermined time point after the start of display of the current musical score picture, then the current musical score picture displayed on the display device 6A is erased so that a next musical score picture is displayed on the display device 6A. For example, in the case where the musical score segments of two measures are to be displayed at one time, the musical score segments of next two measures are displayed at a time point when performance of the musical score segments of the current two measures have been completed. In this way, the musical score of the training music piece can be displayed in predetermined lengths from the beginning to end in accordance with a progression of the model performance. Also, at this step S14, the performance-position instructing bar P is moved horizontally rightward to update the displayed performance position. At next step S15, detection is made on presence/absence of a musical score event in relation to the current performance position corresponding to the calculated MIDI clock pulse. At step S16, it is determined whether or not such a musical score event has occurred. If answered in the affirmative at step S16, then the display style (e.g., display color) of the performance motion picture is updated, at step S17, on the basis of the note data and playing body part data included in the event data of another or next musical score event immediately following the detected musical score event. If, as the next musical score event data, instrument type data indicative of the hi-hat cymbals HH is recorded in the note data and playing body part data indicative of the right hand is recorded in correspondence with the note data, "right hand" and "hi-hat cymbals HH" are displayed in the display style (e.g., red color) preset for the right hand as shown in FIG. 5. Similarly, If, as the next musical score event data, instrument type data indicative of the snare drum SD is recorded in the note data and playing body part data indicative of the left hand is recorded in correspondence with the note data, "left hand" and "snare drum SD" are displayed in the display style (e.g., blue color) preset for the left hand as shown in FIG. 5.

Namely, in the instant embodiment, the performance event data of the performance event following the musical score event present at the timing corresponding to the MIDI clock pulse calculated on the basis of the processing clock pulse, having triggered the current execution of the interrupt processing, is read out from among the musical score data having been set earlier in readiness for readout at step S3 of FIG. 8, and the display style of the musical instrument represented by the instrument type data in the note data is changed, on the basis of the note data and play body part data in the read-out musical score event data, to a particular more-distinguishable display style corresponding to the playing body part data. Namely, the display style employed here is updated with the display style preset for each playing body part or with the display style set as desired by the user. Settings of the display styles preset for the individual playing body parts are recorded in the predetermined recording area, and reference is made here to such settings of the display styles. In this way, the instant embodiment visually displays, on the display device 6A, the performance motion screen (i.e., musical instrument image GH depicting the musical instrument of the training performance part and player image SH depicting the model player playing the musical instrument) along with the musical score screen representative of the musical score of the training music piece and play body parts to be used for playing the musical instrument of the training performance part.

Note that the above-described musical score screen may be displayed using the same display styles as used in the performance motion screen. For example, notes and play body parts on the musical score screen may be displayed in predetermined display styles (e.g., colors) preset for individual playing body parts; namely, notes in the musical score picture and playing body parts in the playing body part picture may be displayed in the same body-part display styles as in the performance motion screen. Thus, with the musical score screen as well, the user is allowed to execute a performance while readily ascertaining playing body parts to be used. In this case, when the performance picture is displayed on the performance motion screen, the display style, on the performance picture, of each musical instrument or portion thereof to be played currently into a particular display style corresponding to a body part of a player to be used for playing the musical instrument or portion thereof, can be changed in accordance with a progression of the musical score data.

Also note that in displaying playing body parts on the performance motion screen or musical score screen, there may be displayed only one or more playing body parts selected by the user. This arrangement is more preferable in that it displays only playing body parts of which the user requires performance instructions and the user is thereby allowed to do performance practice with increased efficiency. It should be appreciated that whereas the embodiment has been described above as displaying each playing body part of a next performance event in a predetermined display style or mode other than the normal display style, the present invention is not so limited; for example, each playing body part of the current performance event may be displayed in a predetermined display style other than the normal display style. In an alternative, each playing body part of the current performance event and each playing body part of the next current performance event may be displayed in different display styles for easier distinction therebetween. For instance, each playing body part of the current performance event may be displayed continuously in a predetermined color, and each playing body part of the next performance event may be displayed in a predetermined color in a blinking fashion. Further, in displaying each playing body part of the current performance event, the playing-body-part display timing on the performance motion screen and musical score screen may be set to be a little ahead of the reproduction timing of the corresponding performance data.

The above-described musical score display is only illustrative, and any other form of the musical score display may be employed as long as the display allows the user to identify performance events occurring with a progression of the performance. For example, a piano roll or other roll-type musical score indicating events may be displayed on the display device 6A. Specifically, in the case of a drum set, a roll-type musical score indicating hit points for individual musical instruments constituting the drum set, such as hi-hat cymbals, bass drum, snare drum and tam—tam, may be displayed on the display device 6A in predetermined lengths (e.g., two measures at a time), so as to indicate, to the user, which of the musical instruments should be played or operated currently. Namely, in this case, the hit-point-indicating roll-type musical score is scrolled on the display device 6A in accordance with a progression of the training music piece performance so that each of the hit points recorded on the roll-type musical score indicates, as a musical instrument to be currently played, the musical instrument located at a predetermined position on the display device 6A. In an alternative, a scroll bar indicating hit points may be displayed in such a manner that it is moved in accordance with a progression of the training music piece performance and the musical instrument indicated at the hit point overlapping (pointed to by) the scroll bar is indicated as the musical instrument to be currently played. Of course, in such cases too, it is preferable that each of the hit points be displayed in one of display styles preset or selected for individual playing body parts, because a predetermined performance style can be instructed as a musical instrument to be currently played is instructed to the user; for this purpose, only the hit point indicating the musical instrument to be currently played may be displayed in a predetermined color or all the hit points may be displayed in respective predetermined colors. Data controlling the display style (e.g., color) may be incorporated in the performance motion data. Also, particular portions of musical instruments, such as a rim of a drum, may be instructed by the display on the display device 6A.

Further, when the operation is to be carried out for updating the performance motion picture on the basis of the performance motion event data during the above-described interrupt processing (see step S11 of FIG. 9) and if the processing clock pulse (i.e., interrupt clock pulse) having triggered the interrupt processing does not coincide with predetermined read timing of the performance motion event data, an operation is performed, prior to step S11, for calculating motion timing (with a 1/60-sec. resolution) so that the performance motion picture current displayed on the display device 6A is updated on the basis of the performance motion event data read out in accordance with the calculated result (calculated motion timing). In a case where the interrupt clock pulse is generated every 1/120 sec., the operation for calculating the motion timing (with the 1/60-sec. resolution) allows the performance motion event data to be read out every two interrupt clock pulses.

In the above-described embodiment, generation of tones based on the reproduced performance data may be either in audible form or in non-audible form. The audible tone generation may be executed selectively for only one or more, not all, of the performance parts. Namely, the reproduction of the performance data in the present invention does not necessarily involve audible tone generation.

In summary, the present invention is characterized primarily by displaying, along with a performance motion picture indicating model performance motion of a model player, which body part of a practicing player should be used for playing or operating a designated performance operator. With such a characteristic arrangement, the present invention achieves the superior benefit that the practicing player is allowed to readily know visually how the designated performance operator should be operated for musical performance.

What is claimed is:

1. A performance instruction apparatus comprising:
   a supply section that supplies performance data;
   a processing section that executes a reproduction process for reproducing the performance data supplied by said supply section;
   a display section;
   a control section that causes said display section to display a performance picture representative of model performance motion with which a music piece corresponding to the performance data reproduced by said processing section is being played by a model player using a predetermined musical instrument; and
   a display control section that, in accordance with a progression of reproduction of the performance data, changes a display style, on the performance picture displayed via said display section, of each musical instrument or portion thereof to be played currently into a particular display style corresponding to a body part of a player to be used for playing the musical instrument or portion thereof.

2. A performance instruction apparatus as claimed in claim 1 wherein the performance picture includes a musical instrument image indicative of a musical instrument and a player image indicative of a state of a model player playing the musical instrument, and wherein motion of the model player on the player image is displayed dynamically so as to indicate predetermined model performance motion corresponding to the progression of reproduction of the performance data.

3. A performance instruction apparatus as claimed in claim 1 wherein the performance picture includes a picture related to a performance of a percussion instrument.

4. A performance instruction apparatus as claimed in claim 1 wherein said control section causes said display section to display a picture related to a performance of a percussion instrument and a musical score for the performance of the percussion instrument, and wherein said control section causes said display section to display, on the musical score as well, information indicative of a body part of a player to be used for each performance event indicated by the performance data.

5. A performance instruction apparatus as claimed in claim 1 which further comprises a setting section that sets any one of a plurality of particular display styles in response to designation of one of a plurality of body parts of the player.

6. A performance instruction apparatus as claimed in claim 1 wherein said control section reproduces, in response to the reproduction of the performance data, a dynamic performance picture representative of a state where a predetermined musical instrument is being played, and said control section causes said display section to display the reproduced dynamic performance picture.

7. A performance instruction apparatus as claimed in claim 1 wherein said supply section supplies, along with the performance data, data indicative of a musical instrument or portion thereof to be played in response to each performance event indicated by the performance data and body part data indicative of a body part of a player to be used for playing the musical instrument, and wherein said display control section changes a display style of the musical instrument or portion thereof indicated by said data indicative of a musical instrument or portion thereof to be played, into a particular display style corresponding to the body part indicated by the body part data.

8. A performance instruction apparatus as claimed in claim 1 wherein said supply section further supplies musical score data of a music piece cooresponding to the supplied performance data, and wherein said display control section changes, in accordance with a progression of the musical score data, the display style of each musical instrument or portion thereof to be played currently.

9. A performance instruction apparatus comprising:

a supply section that supplies performance data and musical score data of a music piece and performance motion picture data representative of model performance motion with which the music piece is being performed by a model player using a predetermined musical instrument;

a display section; and a control section that executes a reproductive performance of the music piece on the basis of the performance data and causes said display section to display a musical score picture on the basis of the musical score data and a performance picture representative of model performance motion on the basis of the performance motion picture data while controlling the display, by said display section, of the musical score picture and the performance picture, in synchronism with a progression of the reproductive performance of the music piece.

10. A performance instruction apparatus as claimed in claim 9 wherein the performance data, musical score data and performance motion picture data include time data that are based on respective time scales, and wherein said control section converts respective ones of the time data of the performance data, musical score data and performance motion picture data into time data based on a common time scale and causes the reproductive performance and display based on the performance data, musical score data and performance motion picture data to progress in synchronism with each other on the basis of the common time scale.

11. A performance instruction apparatus as claimed in claim 9 which further comprises a display control section that, in accordance with a progression of reproduction of the performance data, changes a display style, on the performance picture displayed via said display section, of each musical instrument or portion thereof to be played currently into a particular display style corresponding to a body part of a player to be used for playing the musical instrument or portion thereof.

12. A performance instruction apparatus as claimed in claim 9 which further comprises a display control section that, in accordance with a progression of musical score data, changes a display style, on the performance picture displayed via said display section, of each musical instrument or portion thereof to be played currently into a particular display style corresponding to a body part of a player to be used for playing the musical instrument or portion thereof.

13. A performance instruction method comprising:

a step of supplying performance data;

a step of reproducing the performance data supplied by said step of supplying;

a step of causing a display device to display a performance picture representative of model performance motion with which a music piece corresponding to the performance data reproduced by said step of reproducing is being played by a model player using a predetermined musical instrument; and a step of, in accordance with a progression of reproduction of the performance data, changing a display style, on the performance picture displayed via said display device, of each musical instrument or portion thereof to be played currently into a particular display style corresponding to a body part of a player to be used for playing the musical instrument or portion thereof.

14. A performance instruction method comprising:

a step of supplying performance data and musical score data of a music piece and performance motion picture data representative of model performance motion with which the music piece is being performed by a model player using a predetermined musical instrument; and a step of executing a reproductive performance of the music piece on the basis of the performance data and causing a display device to display a musical score picture on the basis of the musical score data and a performance picture representative of model performance motion on the basis of the performance motion picture data while controlling the display, by said display device, of the musical score picture and the performance picture in synchronism with a progression of the reproductive performance of the music piece.

15. A machine-readable storage medium containing a group of instructions to cause said machine to perform a performance instruction method as defined in claim 13.

16. A machine-readable storage medium containing a group of instructions to cause said machine to perform a performance instruction method as defined in claim 14.

17. A computer program comprising computer program code means for performing all the steps of claim 13 when said program is run on a computer.

18. A computer program comprising computer program code means for performing all the steps of claim 14 when said program is run on a computer.

* * * * *